United States Patent [19]

Bourassin et al.

[11] 4,337,480
[45] Jun. 29, 1982

[54] DYNAMIC AUDIO-VIDEO INTERCONNECTION SYSTEM

[75] Inventors: Lucien Bourassin, Saint-Cloud; Bernard Condat, Le Lion d'Anger; Jacques Fortin, Savigny-sur-Orge; Alain Leger, Juigne sur Loire; Joseph Soto, Montrouge; Jean-Claude Solvinto, Nanterre, all of France

[73] Assignee: Syndicat des Constructeurs d'Appareils Radio Recepteurs et Televiseurs (SCART), Paris, France

[21] Appl. No.: 119,994

[22] Filed: Feb. 8, 1980

[30] Foreign Application Priority Data

Feb. 15, 1979 [FR] France ............................ 79 03862

[51] Int. Cl.³ ............................................. H04N 5/22
[52] U.S. Cl. ........................................ 358/93; 358/83;
358/183; 358/188; 358/194.1; 455/603
[58] Field of Search ................. 358/181, 186, 86, 83, 358/93, 183, 194.1; 364/521, 523; 340/147 CV, 147 CN, 147 P, 147 B, 152 R, 700, 706, 711

[56] References Cited

U.S. PATENT DOCUMENTS 4,052,737  10/1977  Robertson ........................ 358/86
4,200,839   4/1980  Gargini .......................... 358/86
4,276,562   6/1981  Stewart ......................... 358/181

OTHER PUBLICATIONS

The IW 75 Selection-Pulse Unit, Grundig Tech. Inf., vol 22, No. 2, 2/1975, W. Schlewitz.

*Primary Examiner*—Michael A. Masinick
*Attorney, Agent, or Firm*—Finnegan, Henderson, Farabow, Garrett & Dunner

[57] ABSTRACT

A dynamic audio-video interconnection system for connecting together at least one television receiver and a plurality of peripheral units in home audio-visual installations. By means of a remote-control keyboard, the user transmits interconnection orders which are processed by a microprocessor in order to actuate electronic switches which effect the desired interconnection.

20 Claims, 12 Drawing Figures

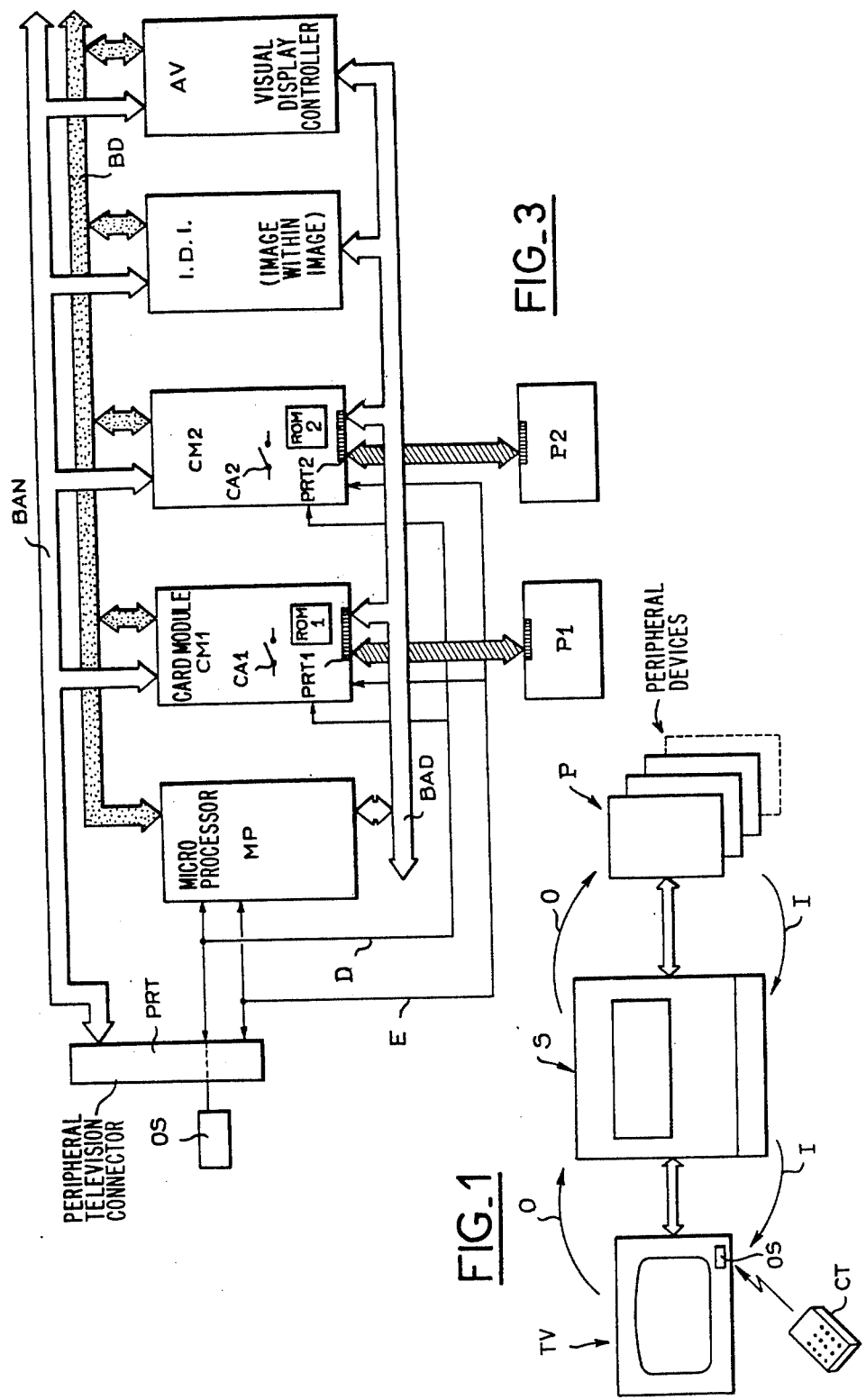

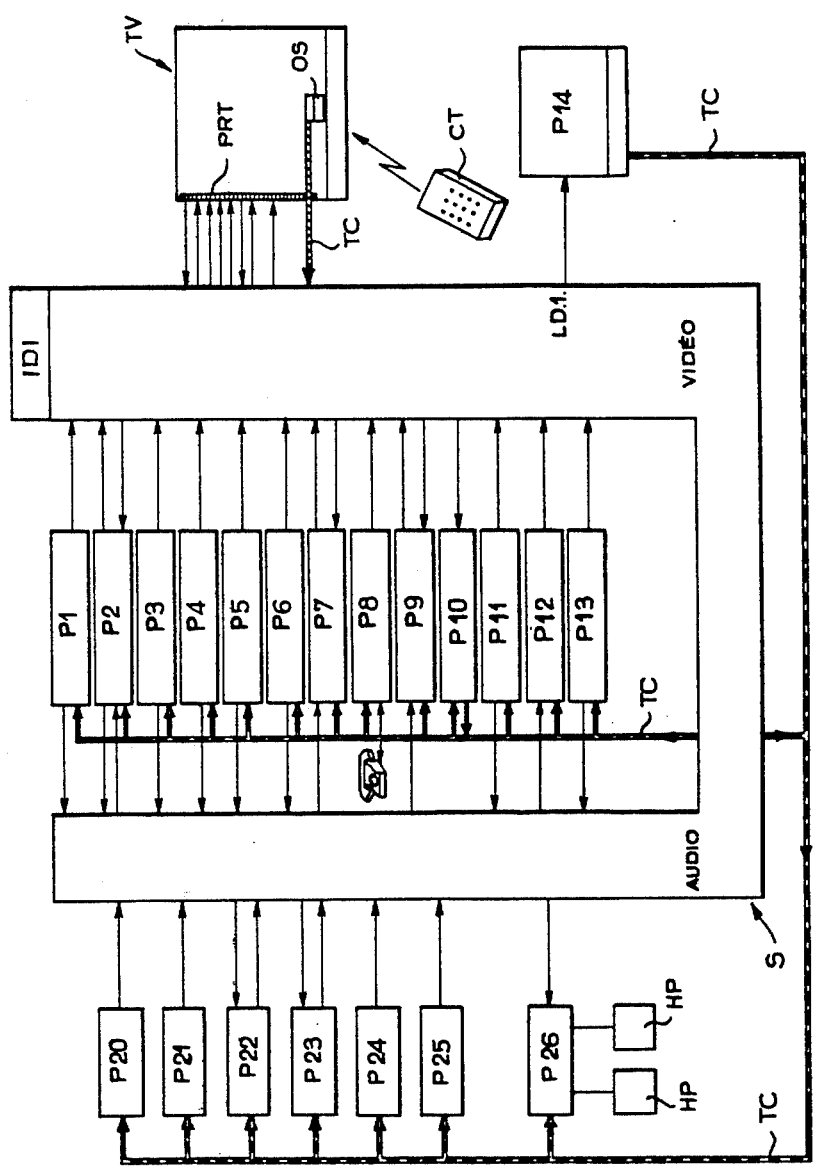
FIG_2

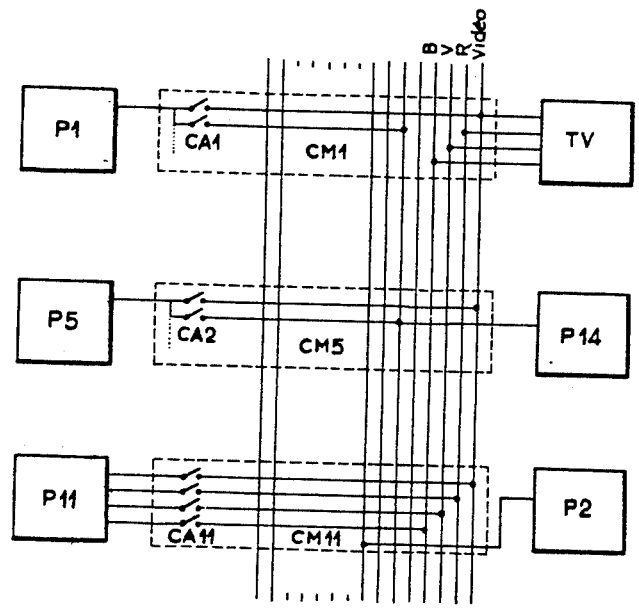
FIG_6
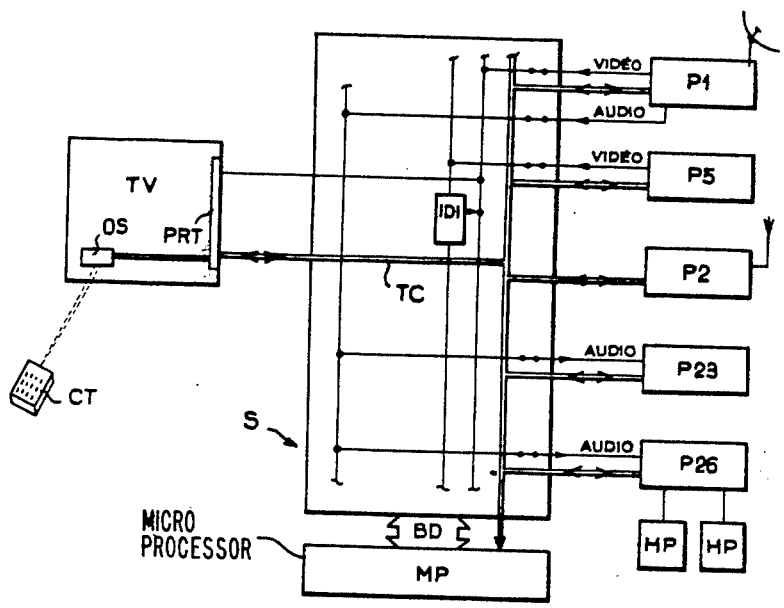
FIG_7

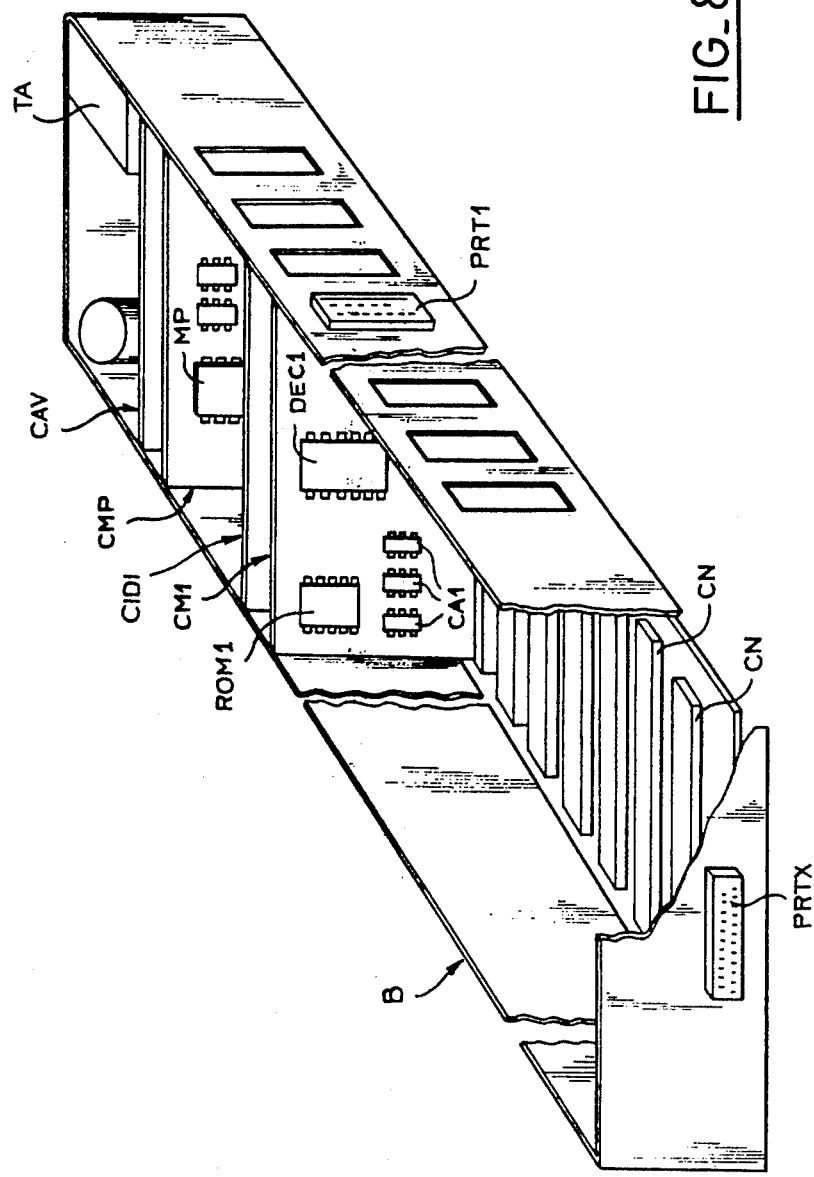
FIG_8

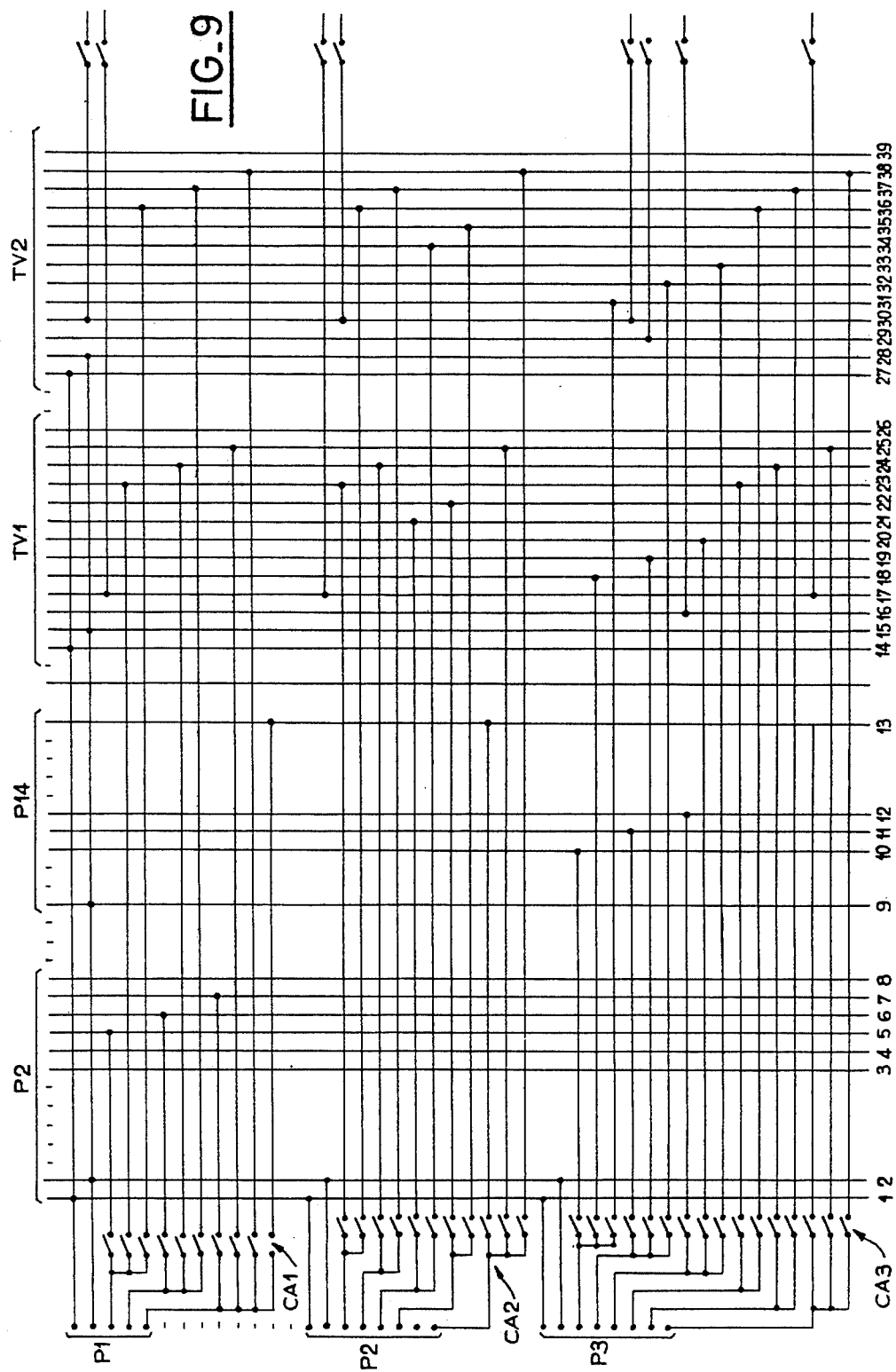

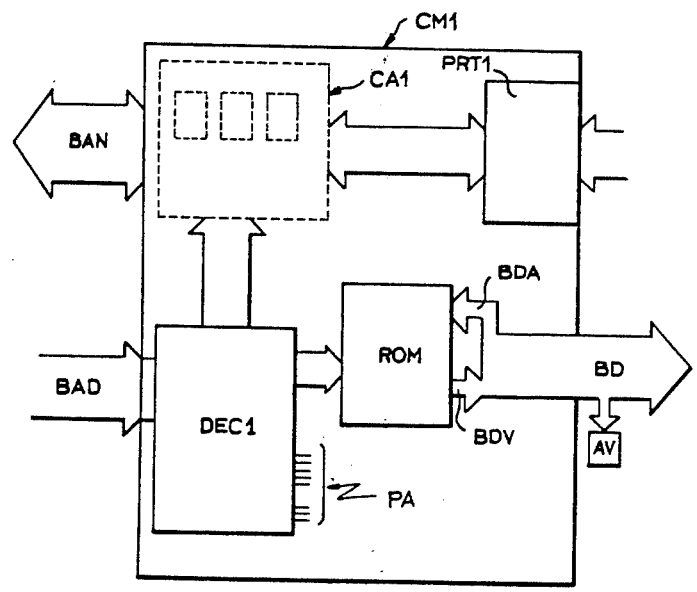
FIG_10
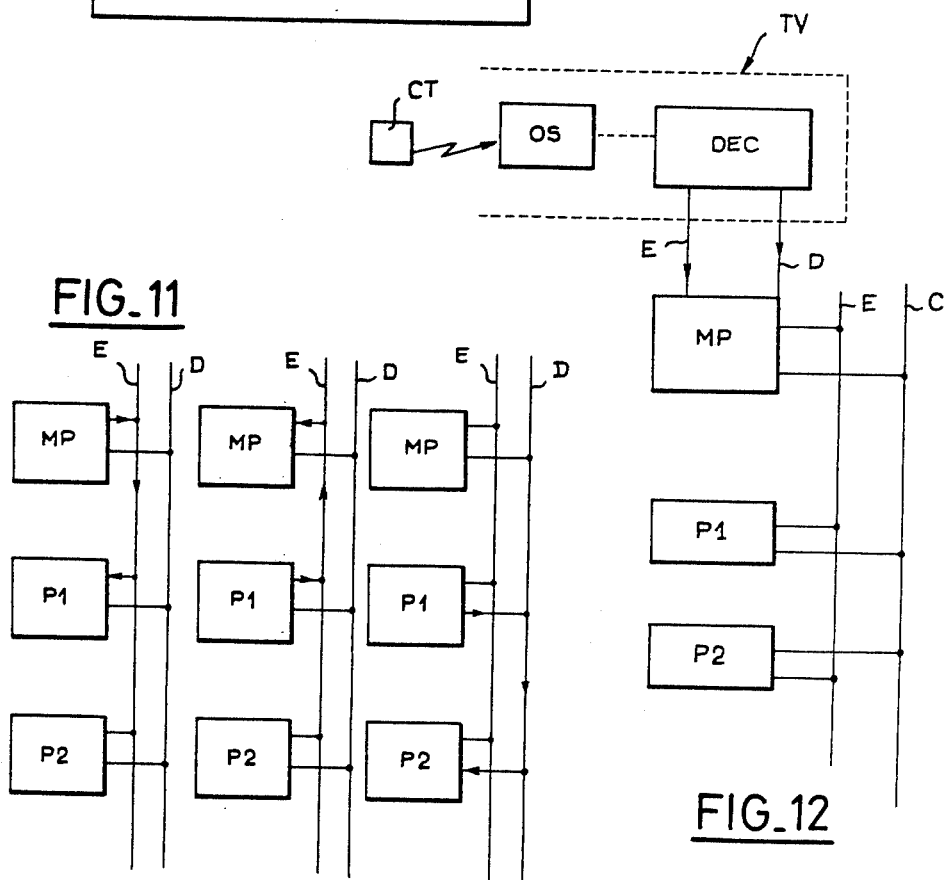
FIG_11
FIG_12

DYNAMIC AUDIO-VIDEO INTERCONNECTION SYSTEM

FIELD OF THE INVENTION

This invention relates to a dynamic audio-video interconnection system for connecting together at least one television receiver and a number of peripheral devices such as a magnetoscope, a video game, a teletext receiver or a satellite-transmission receiver.

BACKGROUND OF THE INVENTION

At the present time, it is possible to connect only one peripheral device at a time to a television receiver. The number of these peripheral units is in any case limited for example to electronic games, magnetoscope connected to receive radio-frequencies via the antenna connection socket of the receiver, or a tape recorder which is connected for audio-frequencies.

In the near future, however, an appreciable increase can be expected in the number of peripheral devices available for use with conventional television receivers. It appears probable that the following peripherals will become readily available:

specific terminals for new broadcasting services, telecommunications available for the use of the general public such as those currently designated as follows:

ANTIOPE: broadcast teletext integrated in the television signal or broadcast over the full channel;

EPEOS: service for automatic recording of programs received;

DISCRET: television service reserved for viewers who are equipped with a suitable decoder;

TITAN: interactive teletext which utilizes the post office channel but is displayed on a television receiver; and new video applications, for example, monitoring cameras, analyzers for diapositives and films, image-within-image, video-disks, which will be used with applications already known such as a magnetoscope or video games.

It can also be expected that the television viewer will wish to employ the elements of an existing high-fidelity "audio" chain or stereo system in conjunction with the television receiver and its peripheral devices in order to have a fully integrated home audiovisual unit.

One for connecting the peripherals to the television receiver is a series of cables and connectors installed by hand. This is a complicated system which is hardly within the capacity of the average viewer, is not very reliable since connection errors are always possible, and, in the final analysis, is not very realistic by reason of its complexity of use.

One improvement of a system of cables and connectors could be found in the use of a set of mechanical switches for providing all possible combinations of interconnections. A system of this type, however, is also unsatisfactory since it is both heavy and complicated.

The aim of the present invention is to provide a system for interconnection of the different elements of a home audio-visual unit such that a viewer can make simultaneous use of the different equipment units in his possession.

According to the invention, the dynamic audio-video interconnection system for connecting together at least one television receiver equipped with a peripheral-television multipin connector and a plurality of peripheral units comprises means for processing a user's orders, and at least one microprocessor controlled by the processing means. The system essentially comprises means for emitting, receiving and transmitting orders directing the selective coupling of a number of peripheral units with each other and/or with the television receiver or receivers, and means for transmitting control orders addressed to each of the units thus connected together. The system further comprises a different series of control stages each connected to a peripheral unit and to the television receiver or receivers and to a remote-control keyboard, each control stage being provided with electronic switches which are necessary for the operation of that stage.

The connections are permanently established and the user need only activate selectively the connections which are of interest at a given amount simply by giving the necessary orders. The real complexity of the operation is then taken into account by the microprocessor. By producing action on the control keyboard, the user establishes a connection between any one peripheral unit and the television receiver or a selective connection between peripheral units.

In a preferred embodiment of the invention, each control stage comprises a read only (ROM) in which are stored detailed data relating to instructions for commissioning of the corresponding peripheral unit, and each module is connected to a programmed visualization automat for displaying the instructions on the television receiver or receivers.

The real operations for putting a given combination of peripheral units into service may be relatively complex as mentioned earlier. As a result of a simple interrogation "in clear" by the user, the precise and complete list of these operations is displayed on the television receiver, thus making it unnecessary for the user to refer to any instruction manual or brochure.

According to an advantageous embodiment of the invention, the control keyboard further comprises means for controlling and adjusting the television receiver or receivers and the various peripheral units in a highly convenient group arrangement.

According to an important characteristic feature of the invention, the system comprises an audio-video analog link between the television receiver or receivers and conductors located on the bottom wall of a casing containing the control stages for transmitting the useful audio-video information either to or form the peripheral unit corresponding to each control stage. The system further comprises an addressing link between the microprocessor and the different control stages for selectively establishing the analog communications of those stages.

In a preferred embodiment of the invention, the control keyboard is connected to an emitting device in cooperating relation with a sensitive element housed within the television receiver. The sensitive element is connected to the different control stages and to the microprocessor for transmitting the orders emitted from the control keyboard. Means for decoding the orders are placed solely within the microprocessor and within the control stages.

By virtue of this arrangement, the television receiver is entirely "transparent" to the signals of the system and can therefore be of standard design without any special arrangement in connection with the system.

In an advantageous embodiment of the invention, the system comprises a remote-control link between the sensitive element, the different control stages and the microprocessor. The remote-control link comprises a single data linkage conductor for connecting the sensitive element to the different control stages and to the microprocessor, and a single exchange-linkage conductor for connecting the control stages to each other and to the microprocessor.

According to a first alternative embodiment of the invention, the peripheral units are each provided with their corresponding control stage and are linked to the microprocessor and to each other by means of a series connection.

In a second alternative embodiment, the peripheral units are connected in parallel to a unit comprising the corresponding control stages and the microprocessor.

Preferably, each control stage comprises decoding means for identifying an item of information which is addressed to that stage.

According to an advantageous technological embodiment of the invention, the control stages and the visualization automat are constructed in the form of plug-in cards fitted in a casing, the bottom wall of which serves as a support for the connection lines.

In this form of construction, the plug-in cards have identical dimensions and are provided with repetitive connection structures for the modular assembly of the cards within the casing.

By virtue of this distinctive feature, the user can readily modify the system by adding more cards as additional peripheral units are acquired.

In this embodiment, the conductors placed on the bottom wall of the casing are connected to each television receiver by means of a peripheral-television multipin connector having input and output connections for a single-cable link between the casing and the television receiver.

Similarly, a peripheral-television multipin connector is associated with each control stage in order to couple that stage to the corresponding peripheral unit.

In preferred embodiment of the invention, the system comprises a module constructed in the form of a plug-in printed circuit card adapted to carry devices for generating control and switching operations which are necessary for the insertion of an auxiliary image or so-called "image-within-image" on the screen of the television receiver or receivers, thus enabling the user to exercize visual control over a program other than the program which he is viewing, means being provided for choosing the principal image and the secondary image from all the available sources.

Further distinctive features and advantages of the invention will become apparent from the following detailed description, reference being made to the accompanying drawings which are given by way of example and not in any limiting sense, and wherein:

FIG. 1 is a functional block diagram which serves to give a general idea of the object of the invention;

FIG. 2 is a general block diagram of the invention;

FIG. 3 is a schematic diagram showing the interconnection of the stages of the chain and the connecting lines;

FIG. 6 is a schematic presentation of the bottom wall of the casing in relation to the card modules;

FIG. 7 is a general diagram showing in particular the arrangement of the remote-control link;

FIG. 8 is a partially cutaway view in perspective showing the casing;

FIG. 9 shows part of the detailed arrangement of lines placed on the bottom wall of the casing;

FIG. 10 is a schematic diagrm of a card module;

FIG. 11 is a functional diagram showing the conversational exchange procedure between two peripheral units;

FIG. 12 is a functional diagram showing the connections beteen the television receiver and its control elements.

Figure 5:
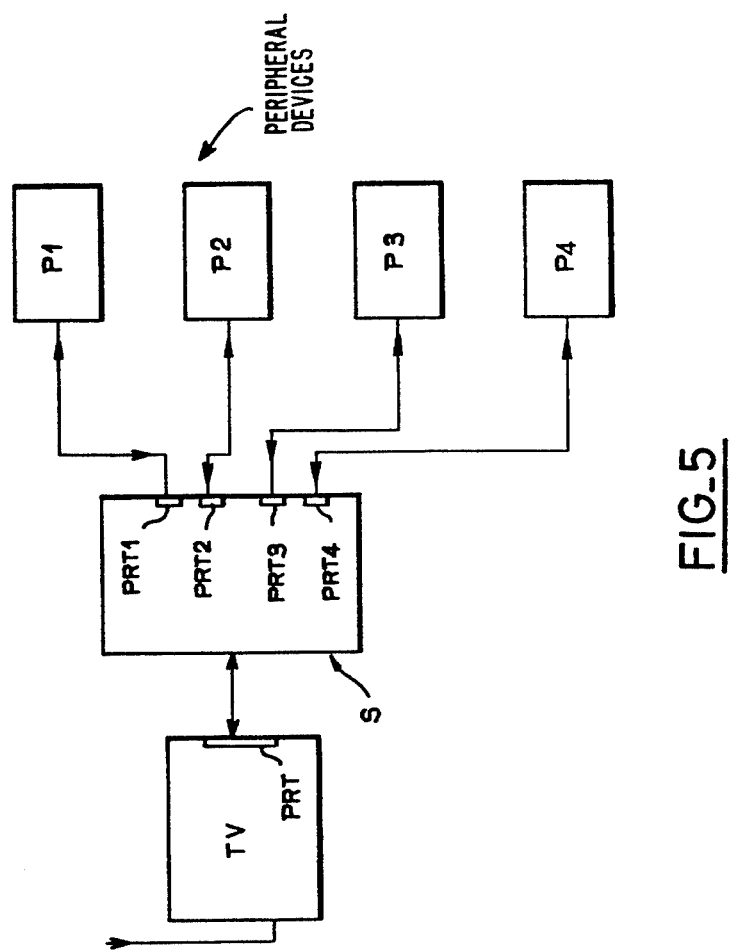
FIGS. 4 and 5 illustrate the principle of the series structure and of the parallel structure, respectively.

Referring first to FIG. 1, the system S according to the invention is interposed between a television receiver TV and a plurality of peripheral devices or units P among which the system establishes a selective functional interconnection.

This interconnection is of the two-way type for transmitting data I from the peripheral units P to the television receiver TV. The data I usually consist of useful "audio" and/or "video" signals generatd or transmitted by the peripheral units, but can also be service signals and orders O transmitted from the television receiver to the peripheral units. To this end, the television receiver TV contains a sensitive element OS for receiving the signals from a remote-control keyboard CT and for transmitting the signals to the system S.

There is no limitation in regard to either the number of peripheral units or to the number of television receivers.

The functional interconnection of the peripheral units P with the systems S is shown more precisely in FIG. 2 in which a certain number of peripheral units are illustrated by way of example and not in any limiting sense. These peripheral units are divided into video (or audio-video) devices and soley audio devices.

Among the video or audio-video peripheral units, there are shown:
  at P1, a 12 GHz receiver for picking-up programs transmitted by satellite,
  at P2, a magnetoscope,
  at P3, a film analyzer for displaying a motion-picture film on a television receiver,
  at P4, a diapositive analyzer used for the same purpose,
  at P5, a video camera,
  at P6, an image-within-image generator,
  at P7, a teletext receiver (designated as ANTIOPE),
  at P8, a conversational teletext transmitter-receiver (designated as TITAN),
  at P9, a reserved program transmitter (designated as DISCRET),
  at P10, a device for automatically servicing a magnetoscope with a signal included in a program to be recorded (designated as EPEOS),
  at P11, a video game,
  at P12, an audio-graphic generator,
  at P13, a video-disk reader,
  at P14, a TV monitor, that is, a service receiver.

Among the purely audio peripheral units, there are shown:
  at P20, an amplitude-modulation receiver,
  at P21, a frequency-modulation receiver,
  at P22, a casette tape recorder,
  at P23, a tape recorder,
  at P24, a digital disk reader,
  at P25, a record-player turntable,
  at P26, a low-frequency amplifier with its loudspeakers HP.

Each peripheral unit mentioned above is connected to the system via one or a number of signal lines represented by arrows. The directions of signal travel can readily be understood from the arrows. Thus, the 12 GHz receiver P1 emits a useful video signal and a useful audio signal. On the other hand, the magnetoscope P2 is capable of both emitting and receiving audio and video signals.

The video signals are either composite video signals or signals corresponding to three linear functions of the three fundamental signals such as, for example, R.V.B. (red, green, blue) according to the type of peripheral units as indicated in FIG. 2.

In the purely audio field, only the tape recorders P22, P23 both emit and receive useful signals. The others only emit signals receive signals (amplifier P26).

The television receiver TV receives and transmits both in video and in audio. Furthermore, it receives the R.V.B. signals and those corresponding to the I.D.I. (image within image) device via a peripheral-television connector PRT 1.

A remote-control line TC (shaded) starts from the sensitive element OS in order to control all the peripheral units by means of the system S and to put the units selectively into service.

In the particular case of the EPEOS automatic magnetoscope trigger circuit (P10), this peripheral unit is only a receiver for a service video signal and drives the magnetoscope P2 by means of the line TC.

Referring now to FIGS. 3 to 8, the constructional design of the system and the arrangement of the interconnections will be described in greater detail. Referring first to FIG. 3, a card module designated as CM1, CM2 is respectively connected to each peripheral unit such as P1, P2 through an associated peripheral-television connector PRT 1, PRT 2. The card modules are also connected to the peripheral-television connector PRT of the receiver through a multiwire analog bus BAN, thus ensuring transmission of useful information between the television receiver and the peripheral units.

A data line D is connected to the sensitive element OS through the connector PRT for receiving orders from the user and transmitting them to a microprocessor MP. The microprocessor MP decodes the orders and transmits them via a multiwire data bus BD to the card modules in order to selectively open or close analog switches CA1, CA2 and to activate the corresponding link between one or a number of predetermined peripheral units and the analog bus BAN. This operation is performed in cooperation with an addressing bus BAD which connects the card modules to the microprocessor.

An exchange line E serves to interconnect the card modules, the television receiver and the microprocessor with a view to ensuring ordered flow of service data along the data line by by virtue of said microprocessor.

Finally, a visual-display controller AV is connected to the microprocessor and to the card modules via the data bus BD for displaying the decoded signals emitted by the microprocessor as well as the instructions contained in the memories ROM 1, ROM 2 contained within the card modules CM1, CM2. These instructions represent details of orders to be given by the user in order to obtain the desired interconnection. The visual-display controller AV displays these instructions on the television receiver by means of the analog bus BAN.

The set of lines D and E constitutes the remote-control line TC mentioned earlier.

From the material aspect, the system comprises a casing B (shown in FIG. 8) in which the card modules, such as CM1, corresponding in number to the peripheral units to be served are plugged into repetitive connectors CN which are all identical, thus endowing the assembly with a modular character which makes it possible if necessary to add additional card modules. Each card module comprises its memory ROM 1 and its set of switches CA1 as well as a decoder DEC 1.

For the sake of enhanced clarity, FIG. 8 shows only a single card module which bears the index 1 but it is readily apparent that the casing B contains a certain number of modules.

After the card modules, provision is made in the casing B for a card CMP which carries the microprocessor MP, a card CAV which carries the visual-display controller AV and a card for the image-within-image device designated by the reference CIDI. The CIDI module comprises means for choosing the principal image and the secondary image from all the available video input sources.

Finally, the casing B further contains a supply transformer TA.

A peripheral-television connector PRT 1 is associated with each card module CM1 and another connector PRT X is provided for the connection with the television receiver.

The different buses and lines are disposed on the bottom wall of the casing in accordance with the simplified diagram of FIG. 6. For the sake of enhanced clarity, there have been shown in this figure only the peripheral units P1, P2, P5, P11 and P14 of FIG. 2 as well as the television receiver TV.

The television receiver TV is connected to a video line and to three lines R, V, B.

The satellite receiver P1 can be connected either to the television receiver TV or to the monitor P14 via the set of switches CA1 of the card module CM1. Similarly, the video camera P5 can be connected to either of these receivers via the set of switches CA2. The video game P11 can be connected in composite video or in R, V, B to the television receiver TV.

Figure 4:
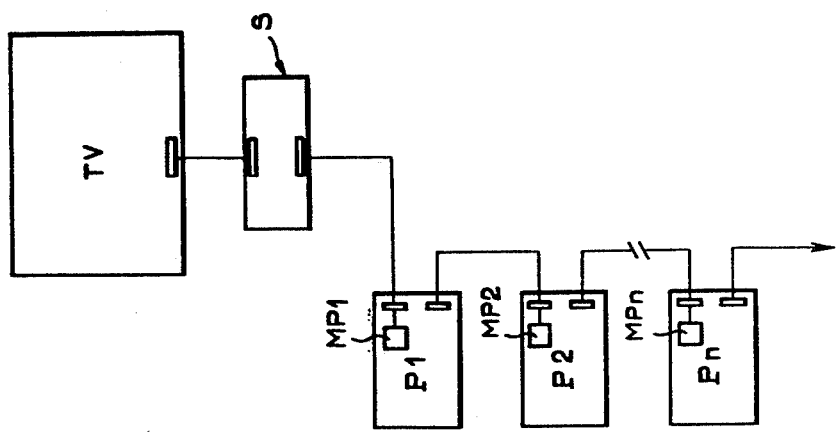

In the example herein described, the various peripheral units are connected in parallel to the casing B which contains all the card modules as shown in the diagram of FIG. 5. It is also possible to contemplate a series connection (as shown in FIG. 4) in which each card module is associated locally with the corresponding peripheral unit which has its own microprocessor (MP1, MP2).

A more detailed example of the structure of the bottom wall of the casing B is illustrated in FIG. 9.

The vertical lines numbered from 1 to 39 are connection lines grouped together to form buses each relating to one unit which has at least one receiving function. More specifically, these lines are as follows:

lines 1 to 8: bus for (receiving) magnetoscope P2,
lines 9 to 13: bus for monitor P14,
lines 14 to 26: bus for television receiver TV1,
lines 27 to 39: bus for television receiver TV2.

As will be understood, these four buses form part of the BAN analog bus mentioned earlier.

Considered in detail, these lines correspond to the following functions:

| 1 | Exchange |
| 2 | Data |

| | -continued |
|---|---|
| 3 | Audio input D (right) |
| 4 | Audio input G (left) |
| 5 | Audio output D |
| 6 | Audio output G |
| 7 | Video output |
| 8 | Video input |
| 9 | Data |
| 10, 11, 12 | R. V. B. |
| 13 | Video output |
| 14 | Exchange |
| 15 | Data |
| 16 | Fast control |
| 17 | Slow control |
| 18 | ) R |
| 19 | ) V . . . . . output |
| 20 | ) B |
| 21 | Audio input D |
| 22 | Audio input G |
| 23 | Audio output D |
| 24 | Audio output G |
| 25 | Video output |
| 26 | Video input |

Lines 27 to 39 relate a second television receiver, TV2, and repeat identically the functions of lines 14 to 26.

In actual fact, the exchange lines 1, 14, 27 are one and the same line, namely the line E mentioned earlier. The same applies to lines 2, 9, 15 and 28 which constitute the line D.

The horizontal lines correspond to connector-pins on peripheral units having at least one output function, namely: the 12 GHz receiver (P1), the magnetoscope (P2), and the film analyzer (P3) (in the R V B version).

In the case of the 12 GHz receiver, the connectors correspond from top to bottom to the following functions:
Exchange
Data
Audio input D
Audio input G
Video input
In the case of the magnetoscope:
Exchange
Data
Audio input D
Audio input G
Audio output D
Audio output G
Video output
Video input
In the case of the film analyzer:
Exchange
Data
Red input
Green input
Blue input
Audio input D
Audio input G
Video input The horizontal lines are permanently connected to at least certain lines of the buses. For example, the lines are thus all connected in parallel to the corresponding lines of two television receivers. The video lines are connected to the video line of the monitor P14 and the RVB lines of the film analyzer are connected to the RVB lines of the monitor and of the television receivers. The magnetoscope is of course not connected to itself.

These permanent connections can be selectively activated by the switches CA1, CA2, CA3 respectively relating to the card modules of the peripheral units P1, P2, P3 which serve to display the image on the monitor or on either of the two television receivers, or on all these receivers.

Sound transmission gives rise to a choice of the same order and the same applies to connection of the magnetoscope.

Slow and fast control switches are also connected to the corresponding lines of the television receivers.

The functional structure of a card module CM1 will now be described in greater detail with reference to FIG. 10 in order to explain its mode of operation.

By means of the peripheral-television connector PRT 1, the card module is connected to the corresponding peripheral unit which is assumed to be located on the right-hand side of the figure. The analog information derived from (or directed to) the peripheral unit is transferred to (or from) either the television receiver or another peripheral unit through the analog bus BAN via the analog switches CA1. The analog switches CA1 are controlled from the addressing bus BAD by means of the address decoder DEC 1 in which the address of the card module has been programmed at PA.

The decoded address drives the ROM by an addressed request BDA derived from the data bus BD. The memory then transmits its contents at BDV via the bus BD to the visual-display controller AV for subsequent display on the television receiver.

The service information transmitted along the exchange lines E and the operation of data line D will be more readily understood by referring to FIGS. 11 and 12. In FIG. 11 (left-hand portion), it is assumed that the microprocessor MP interrogates the peripheral unit P1 via the exchange line E. The peripheral unit P1 answers on the exchange line E (central portion). As a result of the interrogation, the peripheral unit P1 addresses an order to the peripheral unit P2 via the data line D (right-hand portion). Transmission of this order is not disturbed since the microprocessor sends the permission to transmit to the single peripheral unit P1 via the exchange line E.

FIG. 12 shows the action produced on exchanges of this type as a result of orders given by the user through the sensitive element OS which is in turn driven from the output of the remote-control keyboard CT. These orders are transferred to the microprocessor MP by means of a decoder DEC.

One possible mode of utilization of the system according to the invention will now be described by considering a simple example with reference to FIG. 7.

It is assumed that, in addition to the television receiver TV, the user has at his disposal the following peripheral units:
 a 12 GHz receiver P1 for programs transmitted by satellite,
 a monitoring camera P5,
 a magnetoscope P2,
 a tape recorder P23,
 a low-frequency high-fidelity amplifier P26 equipped with two loudspeakers HP.
The user desires:
 to view an opera transmitted by satellite on the television receiver, to listen to the sound of this program on the high-fidelity chain, to record this sound on the tape magnetoscope, to record on the tape recorder a normal program transmitted in UHF and received by antenna at the same time, to watch a children's room at least from time to time by means of the monitoring camera.

The user begins by operating the remote-control keyboard CT in order to transmit a simple code corresponding to the turn-on of a predetermined peripheral unit. This order is transmitted to the microprocessor via the remote-control line TC and addresses and initiates the display of the contents of the memory ROM on the screen of the television receiver TV. The memory ROM addressed corresponds to the peripheral unit under consideration and indicates the detail of operations to be performed in order to ensure that the turn-on of the peripheral device; in fact takes place in the desired manner. These operations are then carried out by the user on the keyboard CT.

When the peripheral units have been suitably interconnected in accordance with the orders transmitted by the remote-control line TC, the video information of the 12 GHz receiver P1 is transmitted to the television receiver TV whereas its audio information is transmitted in parallel to the high-fidelity chain P26 and to the tape recorder P23. The magnetoscope P2, which is connected to the antenna, records another program at the same time and the video information of the monitoring camera P5 is transmitted to the television receiver TV via the module IDI (image within image).

In order to ensure the simplicity of the operation of the remote-control system, the invention provides for the use of specialized keys (function keys such as volume + or −, for example) associated with alphanumeric keys.

Different methdos can be adopted for transmitting the coded data:

(a) it is possible, for example, to depress the "V" "C" "R" keys of the emitter for transmitting a code which will correspond to the group of letters VCR.

(b) according to another method, the emitter transmits either letter by letter or sign by sign.

Thus, in the example chosen, the user would have successively operated the keys "V" "C" "R", whereupon the code signals received would have been grouped together by the decoder so as to form the code "VCR".

The specialized keys emit a predetermined code in either case.

One method for combining the two methods described earlier can also be adopted.

In order to reserve a safety zone and to make provision for a possible extension both in the number of peripheral units controlled and in the number of controls per unit, the code can be constituted by different portions defined as follows:

1. "Start" zone.
2. Peripheral address zone with protections if necessary.
3. Control code zone with protections if necessary.
4. Zone provided if necessary with a parity bit.
5. "Stop" zone.

The length of zones 2 and 3 depends on the number of data contained therein.

In fact, the number of peripheral increases the length of the address zone including its protection and the number of control orders increases the length of the control zone including its protection.

The system according to the invention makes it possible to establish any desired interconnection between peripheral units irrespective of the degree of technical complexity of such interconnection.

The user need only give simple and brief orders, then confirm them with detailed orders, the complexity of which no longer constitutes an obstacle since they are automatically displayed on the television receiver. No material operation of connectors and cables need be performed since the connections are established by means of electronic switches.

To this advantage of flexibility and simplicity of use is added that of a modular construction which permits subsequent addition of card modules in the event of the acquisition of further peripheral units.

The invention is clearly not limited to the examples hereinbefore described and a number of minor alternatives could be contemplated without thereby departing from the scope of the invention. From this it follows, for example, that the modules CM1, CM2 and so forth need not be constituted by physically separate circuits mounted on respective and distinct cards but could consist of circuits combined physically on a single printed circuit medium. It is logical in such a case to designate these modules by the more general term of control stages. In a form of construction of this type, the decoding means DEC1, DEC2 and so forth can then be combined in a single decoding circuit.

What is claimed is:

1. A dynamic audio-video interconnection system comprising:
    a television receiver;
    a peripheral-television multipin connector coupled to said television receiver;
    a plurality of peripheral units for receiving or transmitting video/audio signals;
    a plurality of control stages, each of said control stages being associated with a different one of said peripheral units for coupling said associated peripheral unit to said peripheral-television multipin connector;
    a plurality of electronic switches, each of said electronic switches being associated with a different one of said control stages and being controlled by said associated control stage to make interconnections among said peripheral units and between said peripheral units and said television receiver;
    a remote system control means for generating and transmitting commands requesting said electronic switches to make selected interconnections among said peripheral units and between said television receiver and selected peripheral units;
    means in said television receiver for receiving said transmitted commands and for transmitting said received commands to said control stages; and
    a microprocessor coupled to said receiving and transmitting means and each of said control stages for receiving said commands from said receiving and transmitting means and for controlling said electronic switches to make said requested interconnections.

2. A system according to claim 1 wherein each of said control stages includes an associated read only memory for storing instructions to be performed by said microprocessor during the performance of said requested interconnections and wherein said said system further includes a display control device for controlling said television receiver to display said instructions outputted from said read only memory.

3. A dynamic audio-video interconnection system for selectively connecting together a television receiver to one or more of a plurality of peripheral units via a peripheral-television multipin connector and a microprocessor executing commands directing the selected interconnections for the transfer of audio-video information, the system comprising:
- a plurality of control stages, each of said control stages being associated with a different one of said peripheral units for transferring information between said associated peripheral unit and said peripheral-television multipin connector;
- a remote system control means for generating said commands indicating the interconnections to be made between said television receiver and said selected peripheral units and for transmitting said user orders;
- means in said television receiver for receiving said transmitted commands and for transmitting said received commands to said microprocessor; and
- a plurality of electronic switches, each of said switches being associated with a different one of said control stages and being controlled by said microprocessor in accordance with said received commands to make interconnections among selected peripheral units and between selected peripheral units and said television receiver whereby audio-video information is transmitted among said selected peripheral units and between said selected peripheral units and said television receiver.

4. A system according to claim 3 wherein each of said control stages includes an associated read only memory for storing instructions to be performed by said system during the performance of said selected interconnections and wherein said system further includes a display control device for controlling said television receiver to display said instructions outputted from said read only memory.

5. A system according to claim 1, 2, 3, or 4 wherein said remote system control means includes means for generating signals for controlling and adjusting the operation of said television receiver and said peripheral units.

6. A system according to claim 5 further including a plurality of circuit boards, each of said control stages being associated with a different one of said circuit boards and wherein said associated control stage, read only memory, and electronic switch are formed as separate integrated circuits on said associated circuit boards.

7. A system according to claim 6 further including:
- a casing having a plurality of conductors, each of said conductors being associated with a different one of said circuit boards; and
- an analog signal link connecting said television receiver to said circuit boards through said conductors for transmitting said video/audio signals among said selected peripheral units and between said selected peripheral units and said television receiver.

8. A system according to claim 2 or 4 further including an addressing link coupling said microprocessor to each of said control stages to supply addresses selectively to said read only memories in said control stages.

9. A system according to claim 1 or 3 wherein said remote system control means comprises means for emitting signals representing said transmitted commands and wherein said receiving and transmitting means comprises a signal sensitive device coupled to said microprocessor and each of said control stages, said signal sensitive device for transforming said received signals into said commands and for supplying said commands to said microprocessor and to each of said control stages.

10. A system according to claim 9 wherein said microprocessor and each of said control stages includes an associated decoding means for receiving and decoding said transmitted commands.

11. A system according to claim 9 further including a remote-control link comprising a data linkage conductor coupled to said signal sensitive device, said microprocessor, and said control stages and an exchange-linkage conductor for connecting said control stages to each other and to said microprocessor.

12. A system according to claim 1 or 3 wherein said peripheral units and said control stages associated therewith are linked to each other by means of a series connection.

13. A system according to claim 1 or 3 wherein said control stages are connected in parallel to said peripheral-television multipin connector and to said microprocessor.

14. A system according to claim 1 or 3 further including a plurality of decoding means, each of said decoding means associated with a different one of said control stages for identifying an information transfer to said associated control stage.

15. A system according to claim 2 or 4 further including a plurality of circuit boards, one of said circuit boards being associated with said display control device and others of said circuit boards being singly associated with different ones of said control stages and wherein each of said control stages and said display control device is formed as an integrated circuit on said associated circuit boards and wherein said system further includes a casing having a plurality of conductors, each of said conductors being associated with a different one of said circuit boards, each of said associated circuit boards being pluggable into said casing to form electrical contact with said associated conductor.

16. A system according to claim 15 wherein said circuit boards have identical dimensions and are provided with repetitive connecting structures for the modular assembly of said circuit boards within said casing.

17. A system according to claim 15 wherein said conductors are connected to said television receiver through said peripheral-television multipin connector.

18. A system according to claim 1 or 3 further including a plurality of control stage multipin connectors, each of said control stage multipin connectors being associated with a different one of said control stages to couple said associated control stage to said peripheral unit associated with said associated control stage.

19. A system according to claim 1 or 3 further including means for controlling said television receiver to display a primary image and an auxiliary image simultaneously, said controlling means being connected to said television receiver and to each of said peripheral devices to select said principal image and said secondary image from images supplied by said peripheral devices.

20. A system according to claim 1 or 3 wherein said control stages are formed as a single integrated circuit and wherein each of said control stages includes an associated decoding means, said decoding means being combined into a single decoding integrated circuit.

* * * * *